US012780040B2

(12) United States Patent
Oka et al.

(10) Patent No.: US 12,780,040 B2
(45) Date of Patent: Nov. 3, 2026

(54) POWER SUPPLY

(71) Applicant: Mitsubishi Electric Corporation, Tokyo (JP)

(72) Inventors: Atsushi Oka, Tokyo (JP); Ryotaro Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 503 days.

(21) Appl. No.: 18/560,840

(22) PCT Filed: Jun. 15, 2021

(86) PCT No.: PCT/JP2021/022665
§ 371 (c)(1),
(2) Date: Nov. 14, 2023

(87) PCT Pub. No.: WO2022/264257
PCT Pub. Date: Dec. 22, 2022

(65) Prior Publication Data
US 2024/0359590 A1 Oct. 31, 2024

(51) Int. Cl.
*B60L 58/15* (2019.01)
*H02J 7/80* (2026.01)
*H02J 7/90* (2026.01)

(52) U.S. Cl.
CPC ................ *B60L 58/15* (2019.02); *H02J 7/80* (2026.01); *H02J 7/933* (2026.01); *B60L 2200/26* (2013.01)

(58) Field of Classification Search
CPC ...... B60L 58/15; B60L 2200/26; B60L 58/10; H02J 7/80; H02J 7/933; H02J 7/00
See application file for complete search history.

(56) References Cited

U.S. PATENT DOCUMENTS 7,405,539 B2 7/2008 Chen
8,278,884 B2 10/2012 Morimoto et al.
(Continued)

FOREIGN PATENT DOCUMENTS

GB 2419478 A * 4/2006 ............ H02M 7/493
JP S62217802 A 9/1987

OTHER PUBLICATIONS

International Search Report (PCT/ISA/210) with translation and Written Opinion (PCT/ISA/237) mailed on Aug. 31, 2021, by the Japan Patent Office as the International Searching Authority for International Application No. PCT/JP2021/022665. (8 pages).
(Continued)

*Primary Examiner* — Tuyen K Vo
(74) *Attorney, Agent, or Firm* — Buchanan Ingersoll & Rooney PC

(57) ABSTRACT

A power supply includes a DC-to-DC converter that charges a storage battery and a controller that controls the charging of the storage battery. The power supply has operating modes including a constant-voltage mode where the storage battery is charged at a constant voltage and a current-limiting mode where the storage battery is charged with an upper limit specified for charging current for the storage battery. The controller includes a first control block that controls the constant-voltage mode, a second control block that controls the current-limiting mode, and a conduction ratio command computer that computes a conduction ratio command. The second control block includes a primary lag block that allows a signal to go through for input to the conduction ratio command computer upon an operating mode switchover from the constant-voltage mode to the current-limiting mode.

12 Claims, 6 Drawing Sheets

(56) References Cited

U.S. PATENT DOCUMENTS

| | | | | |
|---|---|---|---|---|
| 10,513,199 | B2 * | 12/2019 | Son | B60L 58/10 |
| 10,903,674 | B2 * | 1/2021 | Wen | H02J 1/10 |
| 2012/0147638 | A1 * | 6/2012 | Kitanaka | B60L 50/52<br>363/95 |
| 2017/0346329 | A1 * | 11/2017 | Shi | H02J 7/00 |
| 2019/0089190 | A1 * | 3/2019 | Yang | H01M 10/44 |

OTHER PUBLICATIONS

Office Action dated Jun. 15, 2026, issued in the corresponding Indian Patent Application No. 202327083571. (7 pages).

* cited by examiner

POWER SUPPLY

FIELD

The present disclosure relates to a power supply that supplies direct-current power to a load to be installed on a railway vehicle.

BACKGROUND

A storage battery is among loads that are installed on railway vehicles and supplied with direct-current power. A power supply described in Patent Literature 1, which is mentioned below, includes a power converter apparatus that charges a storage battery installed on a railway vehicle.

Generally, appropriate switching based on charging voltage for the storage battery is performed between a current-limiting mode and a constant-voltage mode in charging the storage battery. Furthermore, during the charging of the storage battery, conduction ratio control is performed to control a length of application of a gate signal to a gate of a switching element included in a power converter.

CITATION LIST

Patent Literature

Patent Literature 1: Japanese Patent Application Laid-open No. S62-217802

SUMMARY OF INVENTION

Problem to be Solved by the Invention

A unique problem with a power supply installed on a railway vehicle is significant fluctuation of overhead line voltage that is applied, as a base of input voltage for the power supply, from an overhead line, a third rail, or the like. Therefore, when there is, for instance, a sudden increase in overhead line voltage, a conduction ratio is reduced by the conduction ratio control for restrained fluctuation of input voltage for the storage battery under charge control. However, there are cases where the fluctuation of the overhead line voltage cannot be followed, leading to an increase in charging current for the storage battery that causes a switchover from the constant-voltage mode to the current-limiting mode. The switchover from the constant-voltage mode to the current-limiting mode, on the other hand, causes a sharp step-up in the conduction ratio of the gate signal that may lead to problematic occurrence of excessive inrush current into the storage battery.

The present disclosure has been made in view of the above, and an object of the present disclosure is to obtain a power supply capable of preventing excessive inrush current from flowing into a storage battery even upon a switchover from the constant-voltage mode to the current-limiting mode.

Means to Solve the Problem

To solve the above-stated problem and achieve the object, a power supply according to the present disclosure is a power supply equipped with a power converter that supplies direct-current power to a load to be installed on a railway vehicle while charging a storage battery as one of a plurality of the loads. The power supply includes a voltage sensor, a current sensor, and a controller. The voltage sensor detects direct-current voltage that the power converter applies to the storage battery. The current sensor detects current flowing between the power converter and the storage battery. The controller controls the storage battery charging on the basis of a detection value of the voltage sensor and a detection value of the current sensor. The power supply has operating modes including a constant-voltage mode where the storage battery is charged at a constant voltage and a current-limiting mode where the storage battery is charged with an upper limit specified for charging current for the storage battery. The controller includes a first control block that controls the constant-voltage mode, a second control block that controls the current-limiting mode, and a conduction ratio command computer. The conduction ratio command computer computes a conduction ratio command based on an output of either the first control block or the second control block. The conduction ratio command is a value commanding a conduction ratio of a gate signal that operates a switching element included in the power converter. The second control block includes a primary lag block that allows a signal to go through for input to the conduction ratio command computer upon an operating mode switchover from the constant-voltage mode to the current-limiting mode.

Effect of the Invention

The power supply according to the present disclosure has an effect of preventing excessive inrush current from flowing into the storage battery even upon the switchover from the constant-voltage mode to the current-limiting mode.

DESCRIPTION OF EMBODIMENT

With reference to the accompanying drawings, a detailed description is hereinafter provided of a power supply according to an embodiment of the present disclosure. The embodiment described below is illustrative and is not restrictive of the scope of the present disclosure.

Embodiment

Figure 1:
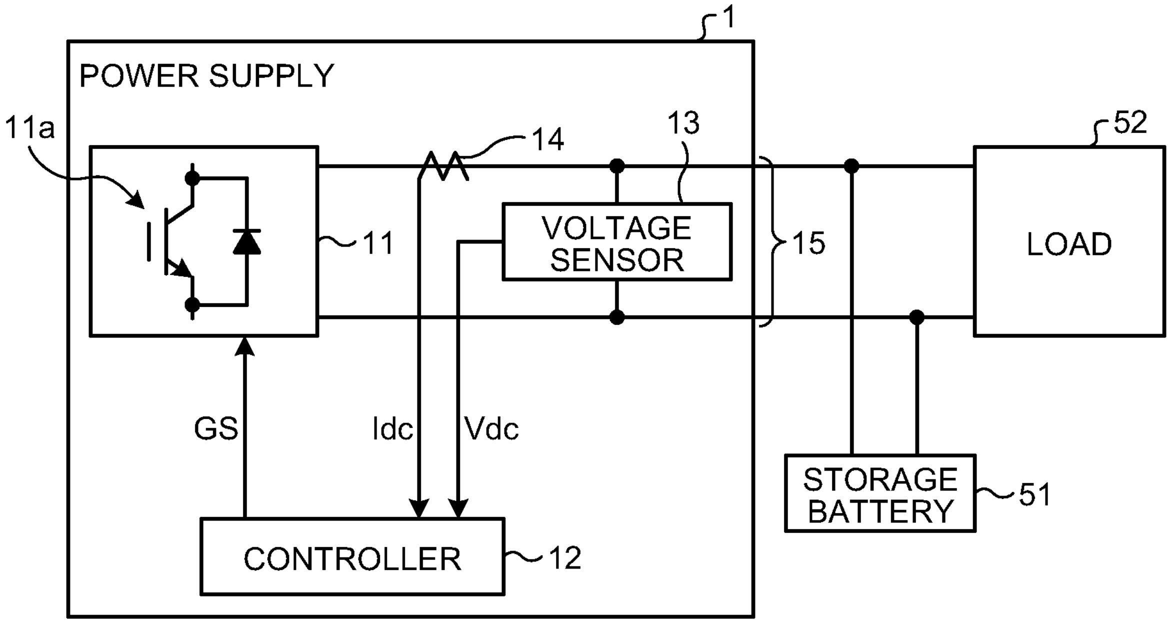
FIG. 1 is a diagram illustrating a configuration example of a power supply according to an embodiment.

FIG. 1 is a diagram illustrating a configuration example of a power supply 1 according to an embodiment. As illustrated in FIG. 1, the power supply 1 according to the embodiment includes a DC-to-DC converter 11. The DC-to-DC converter 11 is a given example of a power converter that converts input power into direct-current power. The DC-to-DC converter 11 includes a switching element 11*a*. The DC-to-DC converter 11 and a load 52 are connected by two electrical wires 15. A storage battery 51 is connected to the electrical wires 15. While various circuit configurations are conceivable for the DC-to-DC converter 11, any type of circuit configuration may be used as long as a circuit that converts the input power into the direct-current power is included.

The load 52 is a direct-current load among auxiliary loads and operates by being supplied with the direct-current power. Examples of the direct-current load include a storage battery, a control power supply, and a lighting fixture, among others. In FIG. 1, the storage battery 51, which is one of a plurality of the direct-current loads, is illustrated separately from the load 52. The term "auxiliary loads" refers to loads other than main motors that are installed on railway vehicles. The auxiliary loads also include alternating-current loads that operate by being supplied with alternating-current power. Examples of the alternating-current load include a door opening and shutting device, an air conditioner, safety equipment, a compressor, and a lighting fixture that is not a direct-current load, among others.

As described above, the power supply 1 includes the DC-to-DC converter 11. The DC-to-DC converter 11 charges the storage battery 51, which is one of the direct-current loads, while supplying the direct-current power to the direct-current loads installed on the railway vehicle.

The power supply 1 includes a controller 12, a voltage sensor 13, and a current sensor 14. The voltage sensor 13 is connected between the two electrical wires 15 and detects direct-current voltage that the DC-to-DC converter 11 applies to the storage battery 51. The current sensor 14 is inserted into either of the two electrical wires 15 and detects current flowing between the DC-to-DC converter 11 and the storage battery 51. The controller 12 performs operation control on the DC-to-DC converter 11 on the basis of a detection value Vdc of the voltage sensor 13 and a detection value Idc of the current sensor 14. The controller 12 controls the charging of the storage battery 51 through the control of the DC-to-DC converter 11.

The power supply 1 has at least two operating modes for controlling the charging of the storage battery 51. One is a "constant-voltage mode", and another is a "current-limiting mode". The constant-voltage mode is an operating mode in which the storage battery 51 is charged at a constant voltage. The current-limiting mode is an operating mode in which the storage battery 51 is charged with an upper limit specified for charging current involved in the charging of the storage battery 51. In both these operating modes, namely the constant-voltage mode and the current-limiting mode, a conduction ratio command is controlled. The conduction ratio command is a value commanding a conduction ratio of a gate signal GS that operates the switching element 11*a*.

Figure 2:
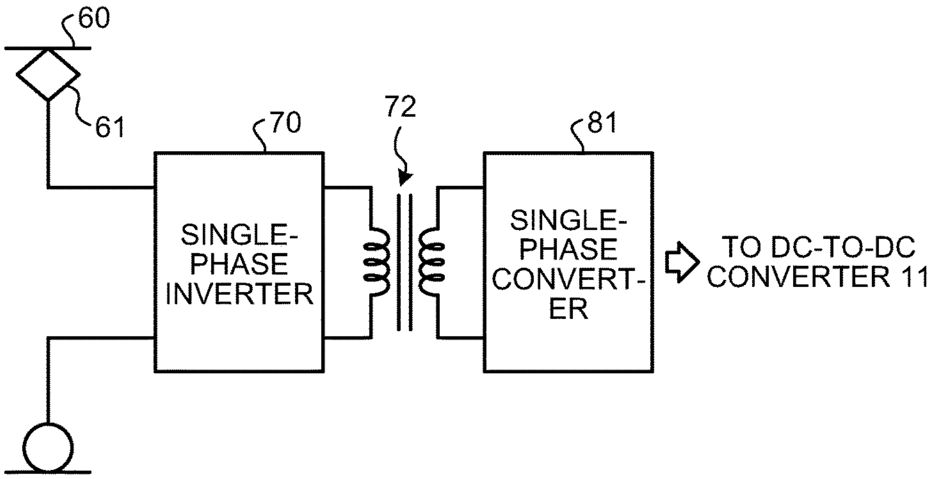
FIG. 2 is a diagram illustrating a first configuration example of a power supply source that generates input power for a Direct Current (DC) to DC converter illustrated in FIG. 1.

FIG. 2 is a diagram illustrating a first configuration example of a power supply source that generates the input power for the DC-to-DC converter 11 illustrated in FIG. 1. In the first configuration example illustrated in FIG. 2, direct-current power supplied from a direct-current overhead line 60 is received via a collector 61. The received direct-current power is converted into alternating-current power by a single-phase inverter 70. The converted alternating-current power is stepped down by a transformer 72 and then supplied to a single-phase converter 81. The stepped-down alternating-current power is converted into the direct-current power by the single-phase converter 81 and then supplied to the DC-to-DC converter 11.

Figure 3:
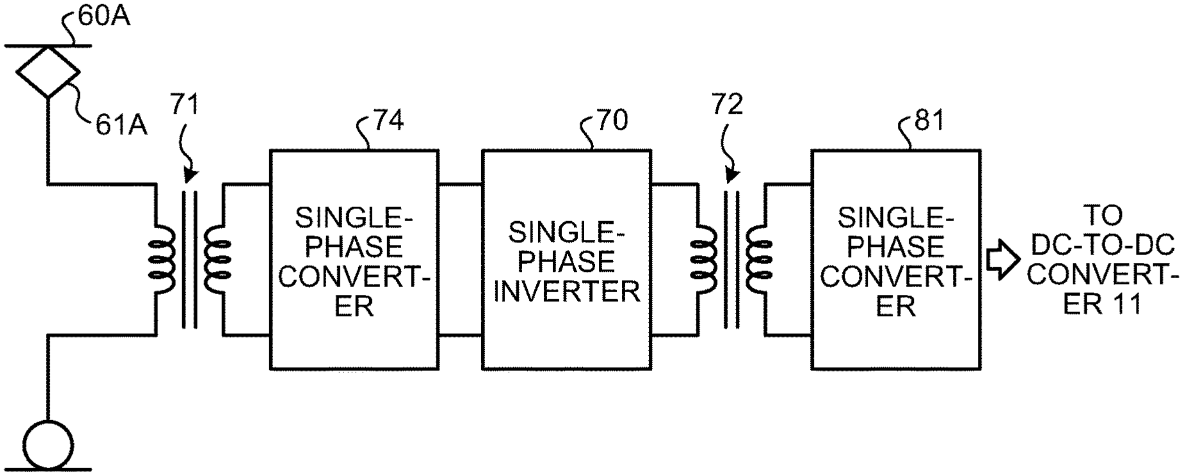
FIG. 3 is a diagram illustrating a second configuration example of the power supply source that generates the input power for the DC-to-DC converter illustrated in FIG. 1.

FIG. 3 is a diagram illustrating a second configuration example of the power supply source that generates the input power for the DC-to-DC converter 11 illustrated in FIG. 1. The second configuration example illustrated in FIG. 3 has an alternating-current overhead line 60A replacing the direct-current overhead line 60 and an alternating-current collector 61A replacing the direct-current collector 61. A comparison between the configuration illustrated in FIG. 3 and the configuration illustrated in FIG. 2 shows that in FIG. 3, a transformer 71 and a single-phase converter 74 are provided in this order between the collector 61A and the single-phase inverter 70. Alternating-current power supplied from the overhead line 60A is received by the transformer 71 via the collector 61A. The received alternating-current power is stepped down by the transformer 71 and then supplied to the single-phase converter 74. The stepped-down alternating-current power is converted into direct-current power by the single-phase converter 74 and then supplied to the single-phase inverter 70. Subsequent operations are the same as those in FIG. 2. In FIGS. 2 and 3, the common components, namely the single-phase inverter 70, the transformer 72, and the single-phase converter 81, are denoted by the same reference characters. However, it goes without saying that capacity or a configuration of each of the components differs depending on overhead line voltage, a frequency of the overhead line voltage, and a difference in number of phases of the overhead line voltage.

Figure 4:
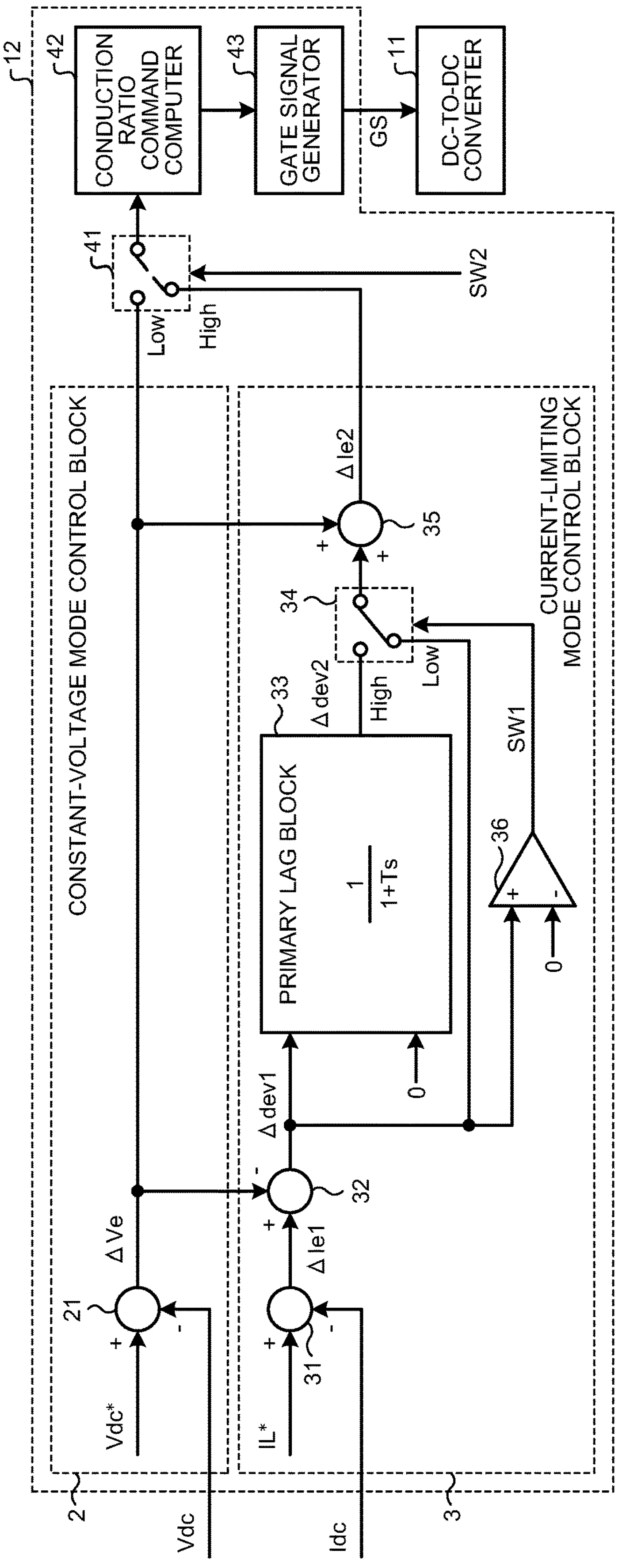
FIG. 4 is a block diagram illustrating a configuration example of control circuitry that implements functions of a controller according to the embodiment.

A description is provided next of how the controller 12 according to the embodiment is configured and operates. FIG. 4 is a block diagram illustrating a configuration example of control circuitry that implements functions of the controller 12 according to the embodiment. The controller 12 includes: a constant-voltage mode control block 2 as a first control block; a current-limiting mode control block 3 as a second control block; a switch 41; a conduction ratio command computer 42; and a gate signal generator 43.

The constant-voltage mode control block 2 is a controller that controls the constant-voltage mode and includes a subtracter 21. The current-limiting mode control block 3 is a controller that controls the current-limiting mode and includes: subtracters 31 and 32; a primary lag block 33; a switch 34; an adder 35; and a comparator 36. In this description, the constant-voltage mode control block 2 may be referred to as the "first control block", and the current-limiting mode control block 3 may be referred to as the "second control block".

In the constant-voltage mode control block 2, the subtracter 21 generates a first deviation signal ΔVe that is a signal representing a deviation between a command value Vdc* for the direct-current voltage and the detection value Vdc of the voltage sensor 13. The first deviation signal ΔVe is input to the switch 41 as an output of the constant-voltage mode control block 2. In other words, the constant-voltage mode control block 2 is configured so that the first deviation signal ΔVe becomes an input signal for the conduction ratio command computer 42. Furthermore, the first deviation signal ΔVe becomes an input signal for the current-limiting mode control block 3.

In the current-limiting mode control block 3, the subtracter 31 generates a second deviation signal ΔIe1 that is a signal representing a deviation between a command value IL* for the charging current and the detection value Idc of the current sensor 14. The subtracter 32 generates a deviation difference signal Δdev1 that is a signal representing a difference between the second deviation signal ΔIe1 and the first deviation signal ΔVe. The deviation difference signal Δdev1 is input to the primary lag block 33, the switch 34, and the comparator 36. A transfer function of the primary lag block 33 can be expressed by $1/(1+Ts)$, using a time constant T and a Laplace operator s.

The primary lag block 33 generates a primary lag signal Δdev2 by applying filtering using a primary lag filter to the deviation difference signal Δdev1. The primary lag signal Δdev2 is input to the switch 34.

The comparator 36 generates an output switching signal SW1 based on the deviation difference signal Δdev1. Specifically, the comparator 36 compares the deviation difference signal Δdev1 with a zero-valued comparison determination value. When the deviation difference signal Δdev1 is less than or equal to the determination value, the output switching signal SW1 that is generated switches the switch 34 to a "Low" side. In this case, the deviation difference signal Δdev1 is input to the adder 35. Therefore, the adder 35 outputs a signal adding the deviation difference signal Δdev1 (=ΔIe1−ΔVe) and the first deviation signal ΔVe, namely the second difference signal ΔIe1. On the other hand, when the deviation difference signal Δdev1 is greater than the determination value, the output switching signal SW1, which switches the switch 34 to a "High" side, is generated. In this case, the primary lag signal Δdev2 is input to the adder 35. Therefore, the adder 35 outputs an addition signal adding the primary lag signal Δdev2 and the first deviation signal ΔVe.

When the deviation difference signal Δdev1 is equal to the determination value, the switch 34 is switched to the "Low" side in the above description but may be switched to the "High" side. In other words, when the deviation difference signal Δdev1 is equal to the determination value, the switch 34 may be switched to either the "Low" or "High" side.

As described above, the current-limiting mode control block 3 is configured so that when the deviation difference signal Δdev1 is less than the determination value, the second deviation signal ΔIe1 becomes an input signal ΔIe2 for the conduction ratio command computer 42.

Furthermore, the configuration of the current-limiting mode control block 3 is such that when the deviation difference signal Δdev1 is greater than the determination value, the signal adding the primary lag signal Δdev2 and the first deviation signal ΔVe becomes the input signal ΔIe2 for the conduction ratio command computer 42. The second deviation signal ΔIe1 or the signal adding the primary lag signal Δdev2 and the first deviation signal ΔVe is input to the switch 41 as an output of the current-limiting mode control block 3.

A mode switching signal SW2 that is output when the operating mode is switched is input to the switch 41. When the mode switching signal SW2 indicates a switchover from the constant-voltage mode to the current-limiting mode, the switch 41 is switched to a "High" side. When the mode switching signal SW2 indicates a switchover from the current-limiting mode to the constant-voltage mode, the switch 41 is switched to a "Low" side. Therefore, when the constant-voltage mode is indicated as the operating mode, the output of the constant-voltage mode control block 2 is input to the conduction ratio command computer 42. When the current-limiting mode is indicated as the operating mode, the output of the current-limiting mode control block 3 is input to the conduction ratio command computer 42.

The conduction ratio command computer 42 computes the conduction ratio command based on the output of either the constant-voltage mode control block 2 or the current-limiting mode control block 3. The gate signal generator 43 generates the gate signal GS based on the conduction ratio command. The gate signal GS is output to the DC-to-DC converter 11 for the DC-to-DC converter 11 to operate on the basis of the gate signal GS, thus controlling charging voltage or the charging current involved in the charging of the storage battery 51 to achieve a desired value.

Figure 5:
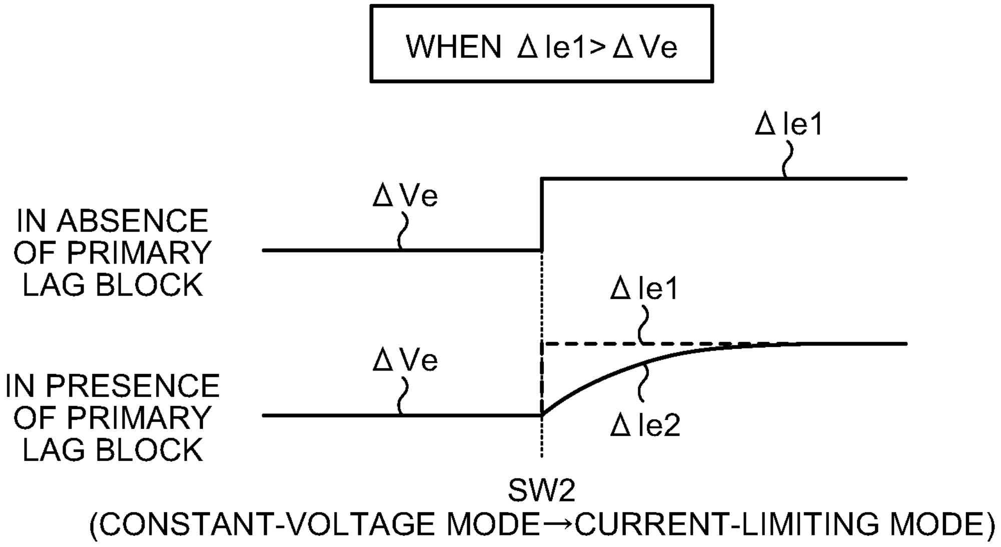
FIG. 5 is a first diagram that is used for describing operation of an essential part of the power supply according to the embodiment.
Figure 6:
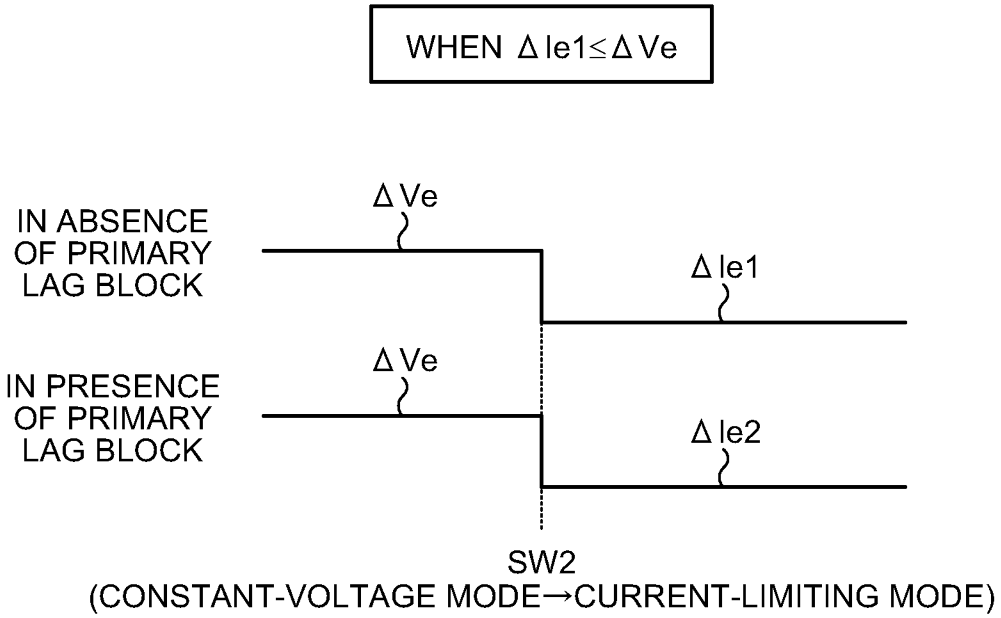
FIG. 6 is a second diagram that is used for describing the operation of the essential part of the power supply according to the embodiment.

With reference to FIGS. 5 and 6, a description is provided next of operation of an essential part of the power supply 1 according to the embodiment. FIG. 5 is a first diagram that is used for describing the operation of the essential part of the power supply 1 according to the embodiment. FIG. 6 is a second diagram that is used for describing the operation of the essential part of the power supply 1 according to the embodiment.

FIGS. 5 and 6 illustrate operating waveforms when the operating mode is switched from the constant-voltage mode to the current-limiting mode. FIGS. 5 and 6 have different magnitude relations between the first deviation signal ΔVe and the second deviation signal ΔIe1, with FIG. 5 illustrating a case where ΔIe1>ΔVe and FIG. 6 illustrating a case where ΔIe1≤ΔVe. Each of FIGS. 5 and 6 illustrates, in a top section, a waveform of an input signal for the conduction ratio command computer 42 for a case where the primary lag block 33 is not included. Illustrated in a bottom section of each of FIGS. 5 and 6 is a waveform of the input signal for the conduction ratio command computer 42 for the case where the above-described primary lag block 33 is included. A broken line is illustrated in the bottom section of FIG. 5, representing the waveform of the second deviation signal ΔIe1 illustrated in the top section of FIG. 5 for comparison.

As mentioned earlier, the first deviation signal ΔVe is the signal that represents the voltage deviation, while the second deviation signal ΔIe1 is the signal that represents the current deviation. These signals have different values unless their values match by coincidence. Therefore, in the absence of the primary lag block 33, a step-up is caused to the signal that is input to the conduction ratio command computer 42 at the moment the operating mode is switched from the constant-voltage mode to the current-limiting mode. This means that the conduction ratio of the gate signal GS, which is input to the DC-to-DC converter 11, experiences a sharp step-up. As a result, excessive inrush current may flow into the storage battery 51. In contrast, in the presence of the primary lag block 33, the output of the primary lag block 33 is a waveform that gently rises due to the time constant T. Therefore, the input signal ΔIe2 for the conduction ratio command computer 42, too, becomes the waveform that gently rises due to the time constant T, as illustrated in the bottom section of FIG. 5, suppressing a sharp change to the conduction ratio of the gate signal GS. As a result, the excessive inrush current can be prevented from flowing into the storage battery 51.

As described earlier, when ΔIe1≤ΔVe, the input signal ΔIe2 for the conduction ratio command computer 42 is the signal that has not gone through the primary lag block 33. Therefore, a step-down is caused to the signal that is input to the conduction ratio command computer 42 at the moment the operating mode is switched from the constant-voltage mode to the current-limiting mode. This means that the conduction ratio of the gate signal GS, which is input to the DC-to-DC converter 11, is stepped down, and this control is important. Reasons for this are explained below.

Consider a case where a short circuit occurs at the load 52 here. When such a short circuit occurs, in order to prevent short-circuit current from damaging a circuit network, the operating mode needs to be switched from the constant-voltage mode to the current-limiting mode to quickly step down the conduction ratio of the gate signal GS. However, the primary lag block 33 acts toward restraining the step-down of the conduction ratio of the gate signal GS and thus negatively acts on short-circuit current restraint. Therefore, in the present embodiment, even when the operating mode has been switched from the constant-voltage mode to the current-limiting mode, the primary lag block 33 is not gone through if ΔIe1≤ΔVe. This produces an effect of not adversely affecting the short-circuit current restraint while excessive inrush current is prevented from flowing into the storage battery 51.

While the above explanation pertains to the case where the short circuit occurs at the load 52, but it is also effective against an output current overshoot that is caused by instantaneous capacity fluctuation of the load 52. In other words, the use of the technique according to the present embodiment also provides the effect of restraining the output current overshoot that is caused by the instantaneous capacity fluctuation of the load 52.

Figure 7:
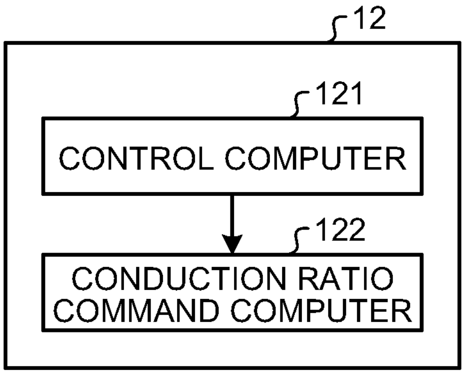
FIG. 7 is a block diagram illustrating a functional configuration example of software that implements the functions of the controller according to the embodiment.
Figure 8:
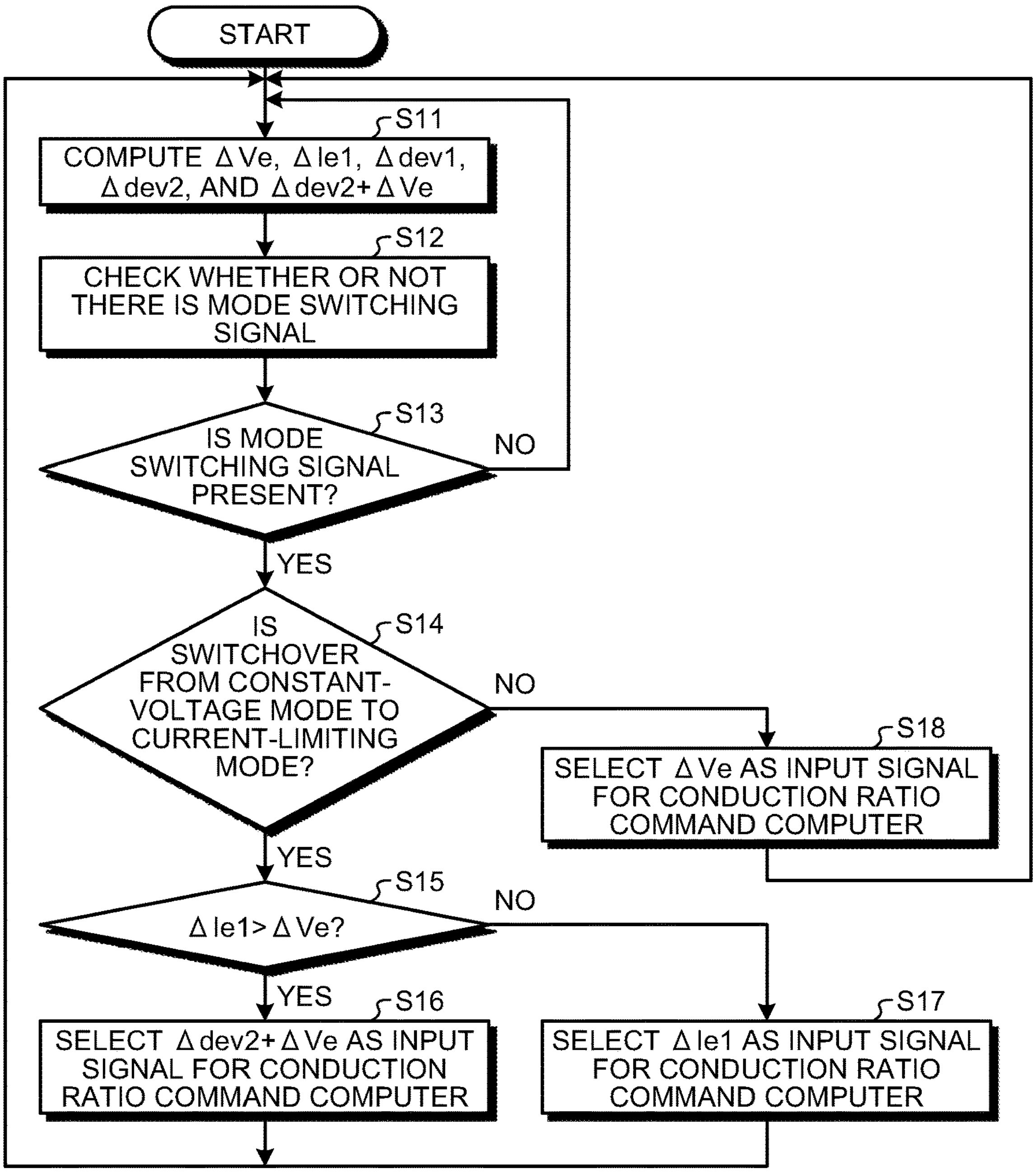
FIG. 8 is a flowchart illustrating an example of a process flow when the software implements the functions of the controller according to the embodiment.

While the configuration example of the control circuitry that implements the functions of the controller 12 according to the embodiment has been described with FIG. 4, the functions of the controller 12 may be implemented by software. FIG. 7 is a block diagram illustrating a functional configuration example of the software that implements the functions of the controller 12 according to the embodiment. FIG. 8 is a flowchart illustrating an example of a process flow when the software implements the functions of the controller 12 according to the embodiment. As illustrated in FIG. 7, the functions of the controller 12 according to the embodiment can be constructed by being divided into a control computer 121 and a conduction ratio command computer 122. The control computer 121 operates according to the flowchart of FIG. 8. With reference to FIG. 8, a description is provided of the process flow.

First, the control computer 121 computes the first deviation signal ΔVe, the second deviation signal ΔIe1, the deviation difference signal Δdev1, and the primary lag signal Δdev2 that have been described above and also computes the addition signal Δdev2+ΔVe, which is the primary lag signal Δdev2 plus the first deviation signal ΔVe (step S11). The control computer 121 checks whether or not there is the mode switching signal SW2 (step S12). If there is no mode switching signal SW2 (step S13, No), a return is made to step S11, and the operations of steps S11 and S12 are repeated. If, on the other hand, there is the mode switching signal SW2 (step S13, Yes), the control computer 121 determines whether or not the switchover is from the constant-voltage mode to the current-limiting mode (step S14). If the switchover is not from the constant-voltage mode to the current-limiting mode (step S14, No), the control computer 121 selects the first deviation signal ΔVe as the input signal for the conduction ratio command computer 122 (step S18). A return is made to step S11 thereafter, and the operations are repeated, starting from step S11.

If at step S14, the switchover is from the constant-voltage mode to the current-limiting mode (step S14, Yes), the control computer 121 further checks the magnitude relation between the first deviation signal ΔVe and the second deviation signal ΔIe1. If ΔIe1>ΔVe (step S15, Yes), the control computer 121 selects the addition signal Δdev2+ΔVe as the input signal for the conduction ratio command computer 122 (step S16). A return is made to step S11 thereafter, and the operations are repeated, starting from step S11. If ΔIe1≤ΔVe (step S15, No), the control computer 121 selects the second deviation signal ΔIe1 as the input signal for the conduction ratio command computer 122 (step S17). A return is made to step S11 thereafter, and the operations are repeated, starting from step S11.

In the above description, for the sake of simplicity, the voltage and the current, which are physical quantities of different unit systems, have been compared. However, these different physical quantities are compared as data normalized with sensor ratios or gains. It is to be noted that the physical quantities to be used for the comparison are not limited to these examples, namely the voltage and the current. Any physical quantities may be used for the comparison.

Figure 9:
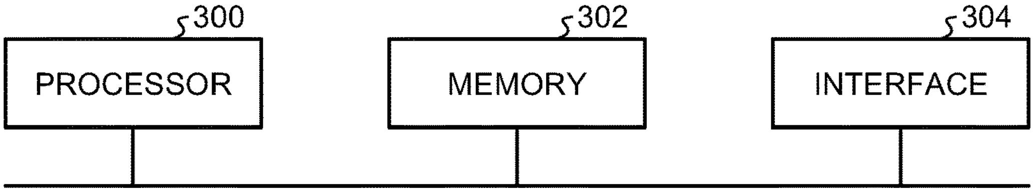
FIG. 9 is a block diagram illustrating an example of a hardware configuration when the software implements the functions of the controller according to the embodiment.

FIG. 9 is a block diagram illustrating an example of a hardware configuration when the software implements the functions of the controller 12 according to the embodiment. In order for the software to implement the functions of the controller 12 according to the embodiment, the configuration can include, as illustrated in FIG. 9, a processor 300 that performs computations, a memory 302 that stores programs to be read by the processor 300 and determination value-related data to be read, and an interface 304 for input and output of signals.

The processor 300 is, for example, an arithmetic means such as an arithmetic unit, a microprocessor, a microcomputer, a central processing unit (CPU), or a digital signal processor (DSP). The memory 302 can be, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

The processor 300 transmits and receives necessary information via the interface 304 and executes the programs stored in the memory 302. By referring to the determination value-related data stored in the memory 302, the processor 300 is capable of executing the sequential process flow illustrated in FIG. 8.

As described above, the power supply according to the embodiment has the operating modes that include the constant-voltage mode where the storage battery is charged at the constant voltage and the current-limiting mode where the storage battery is charged with the upper limit specified for the charging current for the storage battery. The controller includes the first control block that controls the constant-voltage mode, the second control block that controls the current-limiting mode, and the conduction ratio command computer that computes the conduction ratio command based on the output of either the first control block or the second control block. The conduction ratio command is the value commanding the conduction ratio of the gate signal that operates the switching element included in the power converter. The second control block includes the primary lag block that allows the signal to go through for input to the conduction ratio command computer upon an operating mode switchover from the constant-voltage mode to the current-limiting mode. With this configuration, the signal that is input to the conduction ratio command computer goes through the primary lag block the moment that the operating mode is switched from the constant-voltage mode to the current-limiting mode if there is a possibility of a step-up in the input signal. As a result of this operation, the step-up in the input signal for the conduction ratio command computer is avoided, thus leading to the prevention of a sharp change to the conduction ratio of the gate signal, which is input to the power converter. Consequently, the effect of preventing the excessive inrush current from flowing into the storage battery is obtained.

When the operating mode has been switched from the constant-voltage mode to the current-limiting mode, the signal that is input to the conduction ratio command computer goes through the primary lag block; however, the signal that is input to the conduction ratio command computer does not go through the primary lag block when $\Delta Ie1 \leq \Delta Ve$ as in the case where the short circuit occurs at the load 52. When the signal is to be stepped down for input to the conduction ratio command computer, restraining the step-down of the conduction ratio of the gate signal, which is input to the power converter, is avoided thus. Consequently, the effect of not adversely affecting the short-circuit current restraint is obtained while the excessive inrush current is prevented from flowing into the storage battery. Furthermore, the effect of restraining the output current overshoot that is caused by the instantaneous capacity fluctuation of the load is obtained.

In the first control block included in the controller of the power supply according to the embodiment, the first deviation signal is generated as the signal representing the deviation between the command value for the direct-current voltage and the detection value of the voltage sensor. The first control block is configured so that the first deviation signal becomes the input signal for the conduction ratio command computer. In the second control block included in the controller, the second deviation signal is generated as the signal representing the deviation between the command value for the charging current and the detection value of the current sensor. In the second control block, the deviation difference signal is input to the primary lag block as the signal representing the difference between the second deviation signal and the first deviation signal, and the primary lag signal resulting from the deviation difference signal is output from the primary lag block. In the second control block, the deviation difference signal and the determination value are compared. When the deviation difference signal is less than or equal to the determination value, the second deviation signal is selected as the input signal for the conduction ratio command computer. When, on the other hand, the deviation difference signal is greater than the determination value, the addition signal adding the primary lag signal and the first deviation signal is selected as the input signal for the conduction ratio command computer. According to these controls, the three operations are performed concurrently, including the operation of allowing the deviation difference signal to go through the primary lag block, the bypass operation for the deviation signal to not go through the primary lag block, and the operation of comparing the deviation difference signal and the determination value. This produces an effect of preventing, with a reduced time lag, the conduction ratio of the gate signal from experiencing a sharp step-up upon the switchover from the constant-voltage mode to the current-limiting mode. Moreover, an effect of configuring the controller with no significant modifications to existing functions is obtained.

The controller of the power supply according to the embodiment includes the control computer and the conduction ratio command computer. The control computer computes the first deviation signal, the second deviation signal, and the deviation difference signal that have been described earlier. Furthermore, the control computer computes the primary lag signal by applying the filtering using the primary lag filter to the deviation difference signal and computes the addition signal, which is the primary lag signal plus the first deviation signal. On the basis of one of the first deviation signal, the second deviation signal, and the addition signal, the conduction ratio command computer computes the conduction ratio command to be used in the generation of the gate signal, which operates the switching element included in the power converter. When the operating mode has been switched from the constant-voltage mode to the current-limiting mode, the controller selects the addition signal as the input signal for the conduction ratio command computer while the second deviation signal is greater than the first deviation signal. As a result of this operation, a step-up in the input signal for the conduction ratio command computer is avoided, thus leading to the prevention of a sharp change to the conduction ratio of the gate signal, which is input to the power converter. Consequently, the effect of preventing the excessive inrush current from flowing into the storage battery is obtained.

Even when the operating mode has been switched from the constant-voltage mode to the current-limiting mode, the controller selects the second deviation signal as the input signal for the conduction ratio command computer while the second deviation signal is less than or equal to the first deviation signal. With this operation, when the signal is to be stepped down for input to the conduction ratio command computer, restraining a step-down of the conduction ratio of the gate signal, which is input to the power converter, is avoided. Consequently, the effect of not adversely affecting the short-circuit current restraint is obtained while the excessive inrush current is prevented from flowing into the storage battery. Furthermore, the effect of restraining the output current overshoot that is caused by the instantaneous capacity fluctuation of the load is obtained.

The above configurations illustrated in the embodiment are illustrative, can be combined with other techniques that are publicly known, and can be partly omitted or changed without departing from the gist.

REFERENCE SIGNS LIST

1 power supply; 2 constant-voltage mode control block; 3 current-limiting mode control block; 11 DC-to-DC converter; 11*a* switching element; 12 controller; 13 voltage sensor; 14 current sensor; 15 electrical wire; 21, 31, 32 subtracter; 33 primary lag block; 34, 41 switch; 35 adder; 36 comparator; 42, 122 conduction ratio command computer; 43 gate signal generator; 51 storage battery; 52 load; 60, 60A overhead line; 61, 61A collector; 70 single-phase inverter; 71, 72 transformer; 74, 81 single-phase converter; 121 control computer; 300 processor; 302 memory; 304 interface.

The invention claimed is:

1. A power supply equipped with a power converter adapted to supply direct-current power to a load to be installed on a railway vehicle while charging a storage battery as one of a plurality of the loads, the power supply comprising:

a voltage sensor adapted to detect direct-current voltage that the power converter applies to the storage battery;

a current sensor adapted to detect current flowing between the power converter and the storage battery; and a controller adapted to control charging of the storage battery on a basis of a detection value of the voltage sensor and a detection value of the current sensor, wherein the power supply has operating modes including:

a constant-voltage mode where the storage battery is charged at a constant voltage; and a current-limiting mode where the storage battery is charged with an upper limit specified for charging current for the storage battery, the controller includes:

a first control block adapted to control the constant-voltage mode;

a second control block adapted to control the current-limiting mode; and a conduction ratio command computer adapted to compute a conduction ratio command based on an output of either the first control block or the second control block, the conduction ratio command being a value commanding a conduction ratio of a gate signal that operates a switching element included in the power converter, wherein the second control block includes a primary lag block adapted to allow an input signal to the conduction ratio command computer upon an operating mode switchover from the constant-voltage mode to the current-limiting mode.

2. The power supply according to claim 1, wherein the input signal to the conduction ratio command computer does not go through the primary lag block upon an operating mode switchover from the current-limiting mode to the constant-voltage mode.

3. The power supply according to claim 2, wherein a first deviation signal is generated in the first control block as a signal representing a deviation between a command value for the direct-current voltage and the detection value of the voltage sensor, a second deviation signal is generated in the second control block as a signal representing a deviation between a command value for the charging current and the detection value of the current sensor, as a deviation difference signal is input to the primary lag block as a signal representing a difference between the second deviation signal and the first deviation signal, a primary lag signal resulting from the deviation difference signal is output from the primary lag block, the first control block is configured so that the first deviation signal becomes an input signal to the conduction ratio command computer, and the second control block is configured so that one of:

the second deviation signal; and an addition signal adding the primary lag signal and the first deviation signal becomes an input signal to the conduction ratio command computer.

4. The power supply according to claim 3, wherein in the second control block, the deviation difference signal and a determination value are compared:

the second deviation signal is selected when the deviation difference signal is less than the determination value; and the addition signal is selected when the deviation difference signal is greater than the determination value.

5. The power supply according to claim 2, wherein when the operating mode is the constant-voltage mode, the output of the first control block is input to the conduction ratio command computer, and when the operating mode is the current-limiting mode, the output of the second control block is input to the conduction ratio command computer.

6. The power supply according to claim 5, wherein a first deviation signal is generated in the first control block as a signal representing a deviation between a command value for the direct-current voltage and the detection value of the voltage sensor, a second deviation signal is generated in the second control block as a signal representing a deviation between a command value for the charging current and the detection value of the current sensor, as a deviation difference signal is input to the primary lag block as a signal representing a difference between the second deviation signal and the first deviation signal, a primary lag signal resulting from the deviation difference signal is output from the primary lag block, the first control block is configured so that the first deviation signal becomes an input signal to the conduction ratio command computer, and the second control block is configured so that one of:

the second deviation signal; and an addition signal adding the primary lag signal and the first deviation signal becomes an input signal to the conduction ratio command computer.

7. The power supply according to claim 6, wherein in the second control block, the deviation difference signal and a determination value are compared:

the second deviation signal is selected when the deviation difference signal is less than the determination value; and the addition signal is selected when the deviation difference signal is greater than the determination value.

8. The power supply according to claim 1, wherein when the operating mode is the constant-voltage mode, the output of the first control block is input to the conduction ratio command computer, and when the operating mode is the current-limiting mode, the output of the second control block is input to the conduction ratio command computer.

9. The power supply according to claim 8, wherein a first deviation signal is generated in the first control block as a signal representing a deviation between a command value for the direct-current voltage and the detection value of the voltage sensor, a second deviation signal is generated in the second control block as a signal representing a deviation between a command value for the charging current and the detection value of the current sensor, as a deviation difference signal is input to the primary lag block as a signal representing a difference between the second deviation signal and the first deviation signal, a primary lag signal resulting from the deviation difference signal is output from the primary lag block, the first control block is configured so that the first deviation signal becomes an input signal to the conduction ratio command computer, and the second control block is configured so that one of:

the second deviation signal; and an addition signal adding the primary lag signal and the first deviation signal becomes an input signal to the conduction ratio command computer.

10. The power supply according to claim 9, wherein in the second control block, the deviation difference signal and a determination value are compared:

the second deviation signal is selected when the deviation difference signal is less than the determination value; and the addition signal is selected when the deviation difference signal is greater than the determination value.

11. A power supply equipped with a power converter that supplies direct-current power to a load to be installed on a railway vehicle while charging a storage battery as one of a plurality of the loads, the power supply comprising:

a voltage sensor adapted to detect direct-current voltage that the power converter applies to the storage battery;

a current sensor adapted to detect current flowing between the power converter and the storage battery; and a controller adapted to control the storage battery charging on a basis of the detection value of the voltage sensor and the detection value of the current sensor, wherein the power supply has operating modes including:

a constant-voltage mode where the storage battery is charged at a constant voltage; and a current-limiting mode where the storage battery is charged with an upper limit specified for charging current for the storage battery, the controller includes, a control computer adapted to compute:

a first deviation signal as a signal representing a deviation between the detection value of the voltage sensor and a command value for the direct-current voltage;

a second deviation signal as a signal representing a deviation between the detection value of the current sensor and a command value for the charging current involved in the storage battery charging;

a deviation difference signal as a difference between the second deviation signal and the first deviation signal;

a primary lag signal as a result of applying filtering using a primary lag filter to the deviation difference signal; and an addition signal as the primary lag signal plus the first deviation signal, and the controller further includes, a conduction ratio command computer adapted to compute a basis of one of the first deviation signal, the second deviation signal, and the addition signal, a conduction ratio command to be used in generation of a gate signal that operates a switching element included in the power converter, wherein when an operating mode switchover from the constant-voltage mode to the current-limiting mode has occurred, the control computer is adapted to select the addition signal as an input signal to the conduction ratio command computer while the second deviation signal is greater than the first deviation signal.

12. The power supply according to claim 11, wherein even when the operating mode switchover has been made from the constant-voltage mode to the current-limiting mode, the control computer is adapted to select the second deviation signal as an input signal to the conduction ratio command computer while the second deviation signal is less than the first deviation signal.

* * * * *